(12) United States Patent
Martinotti et al.

(10) Patent No.: US 7,929,545 B2
(45) Date of Patent: Apr. 19, 2011

(54) OPTIMIZED SYNCHRONIZATION OF MAC ADDRESS TABLES IN NETWORK INTERCONNECTION APPARATUSES

(75) Inventors: Riccardo Martinotti, Savona (IT); Andrea Corti, Varazze (IT); Raoul Fiorone, Genoa (IT)

(73) Assignee: Ericsson AB, Stockholm (SE)

( * ) Notice: Subject to any disclaimer, the term of this patent is extended or adjusted under 35 U.S.C. 154(b) by 424 days.

(21) Appl. No.: 12/066,980

(22) PCT Filed: Aug. 24, 2006

(86) PCT No.: PCT/EP2006/065648
§ 371 (c)(1),
(2), (4) Date: Apr. 16, 2008

(87) PCT Pub. No.: WO2007/031391
PCT Pub. Date: Mar. 22, 2007

(65) Prior Publication Data
US 2010/0085982 A1    Apr. 8, 2010

(30) Foreign Application Priority Data
Sep. 15, 2005  (IT) .............................. MI2005A1704

(51) Int. Cl.
*H04L 12/28* (2006.01)
*H04L 12/66* (2006.01)

(52) U.S. Cl. .................................................. 370/395.3

(58) Field of Classification Search ........................ None
See application file for complete search history.

(56) References Cited

U.S. PATENT DOCUMENTS

| | | | |
|---|---|---|---|
| 6,604,136 B1 * | 8/2003 | Chang et al. .................. 709/223 |
| 6,735,198 B1 * | 5/2004 | Edsall et al. .................. 370/389 |
| 6,807,172 B1 * | 10/2004 | Levenson et al. ............. 370/389 |
| 2002/0051450 A1 * | 5/2002 | Ganesh et al. ................ 370/389 |
| 2004/0028048 A1 | 2/2004 | Jin |
| 2005/0094634 A1 | 5/2005 | Santhanakrishnan et al. |
| 2006/0036765 A1 * | 2/2006 | Weyman ...................... 709/245 |
| 2007/0268915 A1 * | 11/2007 | Zelig et al. .................... 370/401 |

FOREIGN PATENT DOCUMENTS

JP        2004193821 A        7/2004

* cited by examiner

*Primary Examiner* — Chirag G Shah
*Assistant Examiner* — Jenkey Van
(74) *Attorney, Agent, or Firm* — Coats & Bennett, P.L.L.C.

(57) ABSTRACT

Network interconnection apparatus comprising a platform with interface ports for network interconnection and comprising in turn a first series and a second series of interface port cards and an interconnection unit for commanded interconnection at least between the cards of the first and second series and between cards of the first series. The cards of the first series have their own associated MAC address tables for addressing traffic between ports through the interconnection unit. Each entry of the table has an age field defining in time the age of the entry. The content of the age field is periodically verified and if it reaches a preset maximum figure the entry is updated on the basis of the content of the age field by a corresponding entry in the table of another card of the first series and associated therewith by the information in the entry to be updated. If the content of the age field of the corresponding entry is also a maximum figure, both the entries can be deleted.

9 Claims, 3 Drawing Sheets

Figure 1:
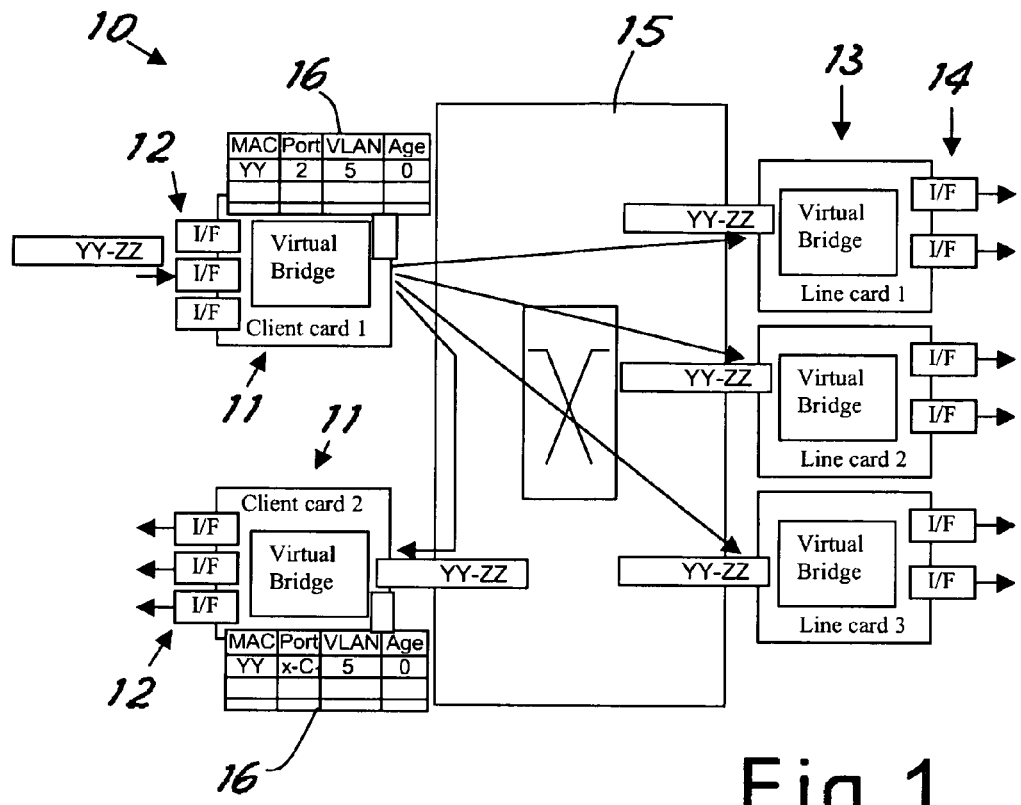

OPTIMIZED SYNCHRONIZATION OF MAC ADDRESS TABLES IN NETWORK INTERCONNECTION APPARATUSES

This invention relates to a method allowing automatic optimized synchronization of MAC address tables and in particular in systems supplying multipoint virtual private LAN services. This invention is also addressed to an apparatus in accordance with said method.

Metropolitan networks are evolved with the essential requirement of supporting virtual LAN services. In a Multi-Protocol Label Switching (MPLS) context this means supplying Virtual Private LAN Service (VPLS) services that in general are characterized by a multipoint-to-multipoint connectivity. This requires the MPLS network to be perceived by the client as a switch and implies some complications in the network architecture and the system compared with the simpler point-to-point connectivity, i.e. Virtual Private Wire Services (VPWS). In multipoint-to-multipoint connectivity, any user location can exchange traffic with any other location on the same virtual LAN.

A user can accede to the VPLS through more than one port from each location and, in general, said ports (physical interfaces) can belong to different traffic cards on the metro system. This poses some possible problems especially on the efficiency of the solution in its entirety.

The client cards hold the so-called Media Access Control (MAC) address tables which contain information on the MAC addresses of the source, the input port, VLAN and other fields such as reference to the age of the entry of the table, which is supposed to be deleted after an appropriate time. Complete connectivity must be realized between client ports and line ports and among client ports.

As clarified below, a problem is generated by the fact that in the MAC tables in general the entries are deleted based on their 'age', represented by a numerical figure inserted in an appropriate field in the entry itself.

Let us assume having two client cards each with a certain number of interfaces or input-output connected to client equipment. Let us assume then that remote client equipment identified by a MAC YY address sends traffic over a certain port of one of said client cards. Said client card sends the traffic to every possible destination (both on the client side and the line side) because it has no knowledge of the exact destination (not yet learned). This operation is known as 'flooding'.

To the other client card is sent the same information that is memorized in the MAC address tables of the first card and that will comprise data like the MAC address, the VLAN label, the port number et cetera. The second card will also memorize the data in its MAC table.

In the opposite direction it is assumed that from the MAC ZZ address the traffic reaches the apparatus over an appropriate line card and is sent to all the client cards that form part of the VPLS; more details are given below on this mechanism.

The information received from the client card and coming from the line is forwarded to the other client card involved in the VPLS service for the purpose of respecting the well known 'split horizon' principle, the purpose of which is to avoid loop. The information is put into the MAC address table of both the customer cards. The age field (which expresses age in seconds) in the MAC address tables is updated automatically.

With the passage of time the MAC YY address still transmits traffic toward ZZ but, while client card 1 keeps its MAC address table updated, they do not make necessary any flooding mechanism but only a simple forwarding from the client card to the right line card, client card 2 does not receive any information about this connection from client card 1 since it is not directly involved in the communication and therefore its age field is progressively increased. In the prior art, having reached the maximum aging time (a typical figure is 300 seconds), the corresponding entry of the MAC table of card 2 is deleted. The traffic which arrives from the line card in the opposite direction is however forwarded to all the client cards belonging to the VPLS (otherwise another MAC address table should be memorized and kept in the line card) even if the traffic must then be handled and forwarded to the client network only from client card 1 since the system keeps this information in the MAC address table of client card 1. Unfortunately, client card 2 is no longer aware of the correct association because of expiration of the associated entry in its MAC address table and therefore the only action that it can take is to realize the flooding towards all the ports (toward the client network) involved in the VPLS. This is traffic that consumes resources of the client network without any real motivation.

In the prior art some solutions have been proposed for reducing the need for flooding.

A first solution calls for memorizing MAC address tables even in the line cards. The line cards are therefore forced to keep complete MAC address tables for each VPLS supported. This however entails complications and unnecessary use of very critical resources.

A second solution calls for complete and continuous synchronization of the MAC address tables on the user cards. With this solution, the MAC address tables, which reside on all the client cards (usually many more than two) need to be completely synchronized, then they must contain the same information at any time. This entails a large increase in communications between all the client cards, a thing that can be extremely heavy and critical.

The general purpose of this invention is to remedy the above mentioned shortcomings by avoiding the problem of unnecessary flooding by means of an optimized synchronization mechanism for the tables that considerably reduces the need for transmitting control information for synchronization of the MAC address tables of the client cards.

In view of this purpose it was sought to provide in accordance with this invention a MAC address tables management method in a system with interface ports for the interconnection of networks with the system comprising a first series of interface port cards and a second series of interface port cards and an interconnection unit for interconnection at least between the cards of the first and second series and between cards of the first series with there being associated with the cards of the first series MAC address tables for addressing traffic between the ports through the interconnection unit with each entry of the table having an associated age field defining in time the age of the entry with the method comprising the phases of verifying whether the age field of an entry reaches a preset maximum age figure and upon reaching said figure upgrading said entry depending on the figure contained in the age field of a corresponding entry in a table associated with another card of the first series and correlated with it by the information in the entry to be updated.

Again in accordance with this invention it was sought to realize a network interconnection apparatus comprising a platform with interface ports for network interconnection and comprising in turn a first and a second series of interface port cards series and an interconnection unit for commanded interconnection at least between the cards of the first and second series and between cards of the first series with there being kept associated with cards of the first series MAC address tables for addressing of the traffic between the ports through the interconnection unit with each entry of the table having an associated age field defining in time the age of the entry and characterized in that it comprises control means that verify periodically whether the age field of an entry reaches a preset maximum age figure and upon reaching of said maximum figure send a synchronization request to another card of the first series and correlated thereto by information in the entry to be updated with means of response to said request being provided to respond depending on the figure contained in the age field of the corresponding entry of the table associated with said other card with the sending of an age figure to be used as the updating or with a deletion command for the entry to be updated.

Figure 2:
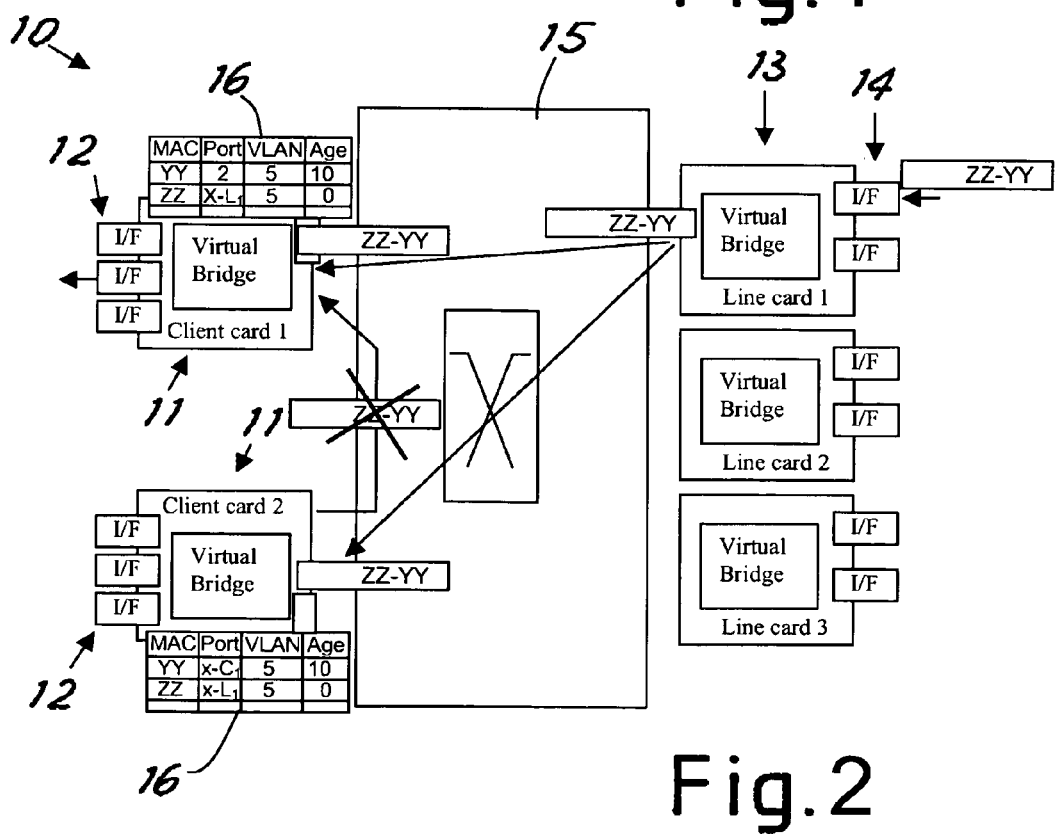
Figure 3:
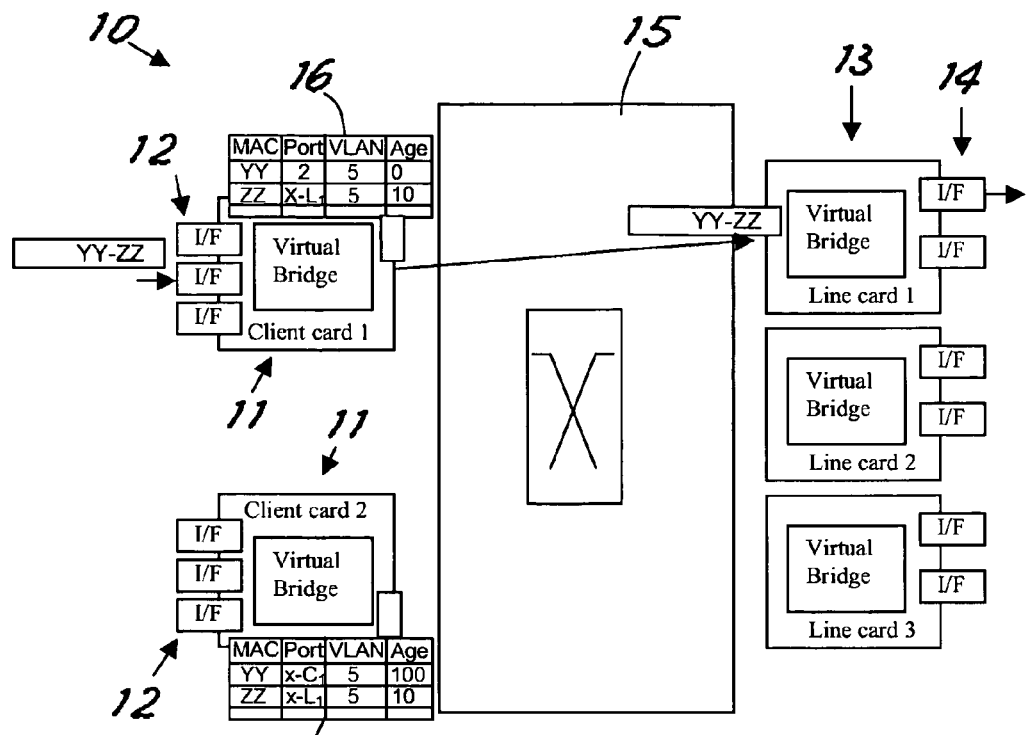
Figure 4:
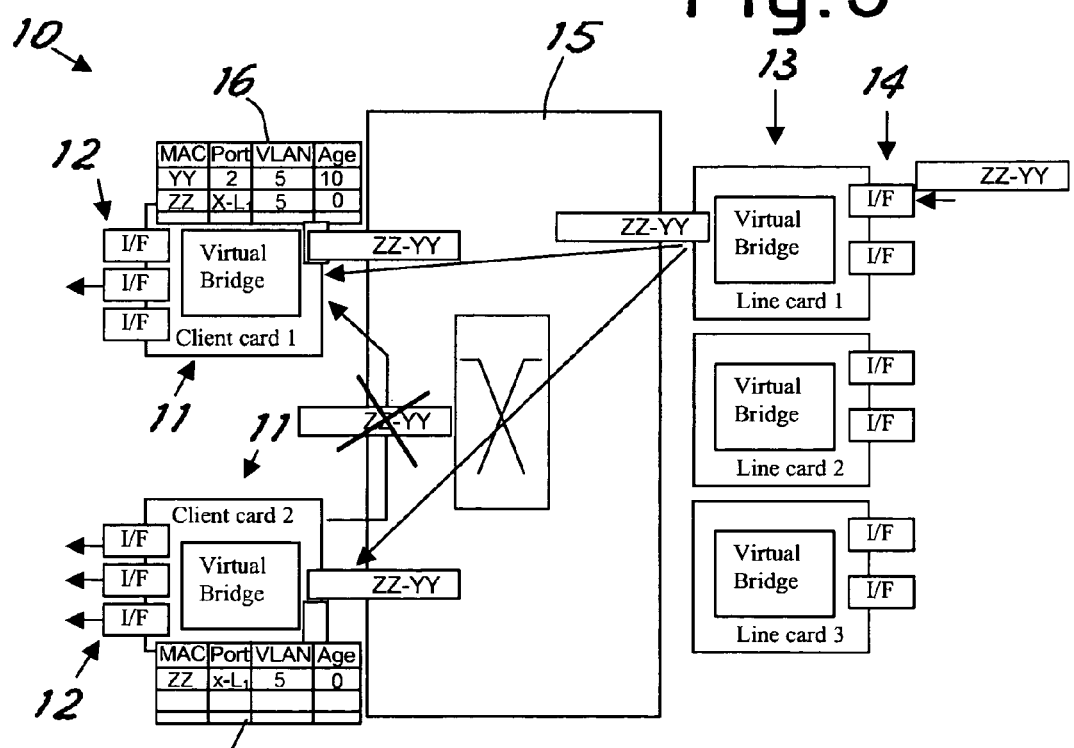
Figure 5:
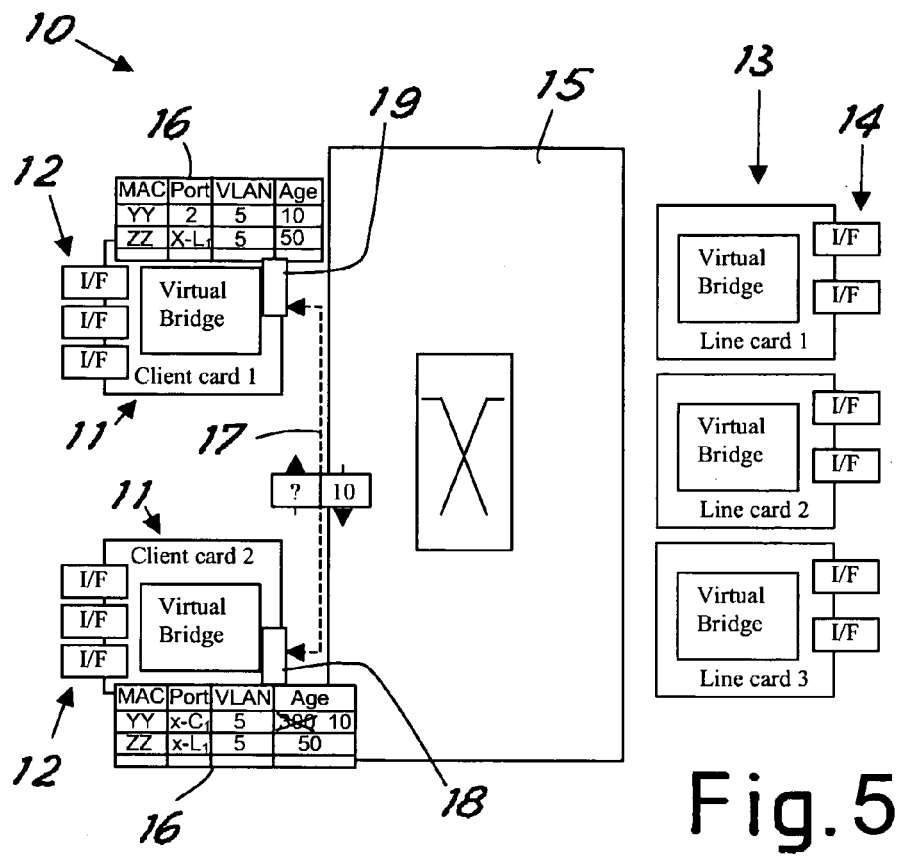
Figure 6:
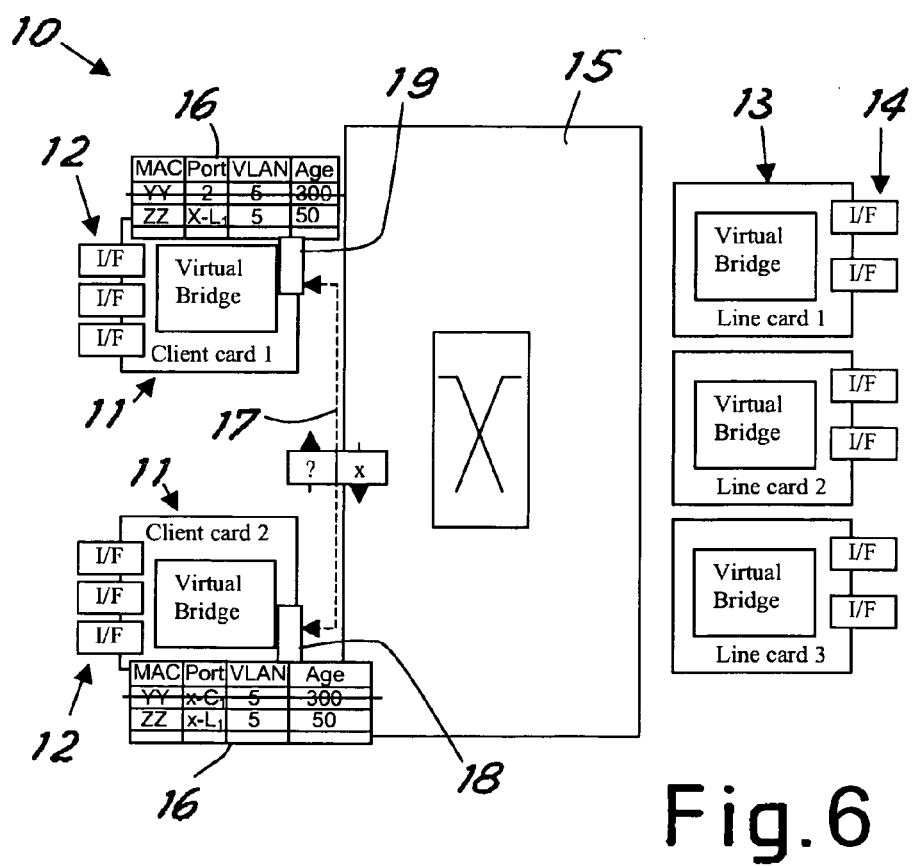

To clarify the explanation of the innovative principles of this invention and its advantages compared with the prior art, there is described below with the aid of the annexed drawings a possible embodiment thereof by way of non-limiting example applying said principles. In the drawings:

FIG. 1 shows a block diagram of a possible implementation of a VPLS interconnection apparatus between networks in a first MAC address learning phase, FIG. 2 shows the apparatus of FIG. 1 in a second MAC address learning phase, FIG. 3 shows the apparatus during a communication phase, FIG. 4 shows a flooding problem that occurs in the prior art, and FIGS. 5 and 6 show the solution in accordance with this invention.

With reference to the figures, FIG. 1 shows an apparatus designated as a whole by reference number 10 that realizes an interconnection platform between networks. It comprises client traffic cards 11 each of which has a certain number of interface ports 12 for connection to network communication equipment of the client (not shown since readily imaginable to those skilled in the art). This equipment can represent physical LAN access nodes of the client. The client interface ports here are assumed to be gathered in two different traffic cards 11 (which will be identified below as 'client card 1' and 'client card 2'). In practice, a different number of cards can exist just as a different number of interface ports can exist for each card.

There are then line cards 13 (three in the example identified as 'line card 1', 'line card 2' and 'line card 3') with their own interface ports 14 for connection to the sections of the networks to which it is desired to connect the client cards for supplying VPLS services. Also for the line cards, the number of these can be in practice different from that shown as the number of interface ports can be different.

As easily imaginable to those skilled in the art, either for the ports on the client side or the ports on the line side the interfaces will vary in a known manner depending on the type and connection technology used.

Among the client cards and the line cards there is a known interconnection unit that can be active or passive depending on implementation, or switch 15 to obtain full connectivity among the client cards and between any client card and any line card.

The structure shown and described up to now is an architecture known in itself and readily imaginable to those skilled in the art in its real implementation and operation. It will therefore not be described in greater detail.

Each client card keeps its own MAC address table 16 that contains the information about the MAC address of the source, the input port, VLAN and other fields, like the age field with reference to the age of the entry of the table.

FIG. 1 shows a first phase of operation in which an address is learnt from a client. It is assumed by way of example that remote client equipment connected to a port 12 (identified as 'port 2') of client card 1 and identified by the address MAC YY sends traffic with the VLAN label for example equal to 5. This information is immediately learnt by client card 1 and memorized in its MAC address table. The card sends the traffic to every possible destination (on both the client side and the trunk side) because it has no knowledge of the exact destination not yet learnt. This process is known as flooding.

Client card 2 is therefore given the same information as card 1 with the only difference being that it was learnt through the switch since it comes from client card 1.

The situation is shown in FIG. 1 with the tables 16 of the two cards that contain the same information (except for the input ports, which are obviously different).

FIG. 2 shows the next step of the learning process in which the client cards learn the address from the line. After a certain time (assumed, for example, 10 seconds) the traffic reaches through the line card 1 from the address MAC ZZ and is sent to all the client cards which are part of the VPLS. The packet arriving from the trunk is forwarded only to the client cards which do not forward it further among themselves to respect the known Split Horizon principle and avoid a loop.

The new information is inserted in the MAC tables of both the client cards. The age field which expresses age in seconds in the MAC tables is automatically updated or zeroed.

In the tables there is now the source and destination information for the traffic arriving from the client equipment that started the transmission. Client card 1 keeps both source and destination in its MAC table and therefore to continue transmission from YY to ZZ no flooding is necessary but only a simple forwarding from the client card to the proper line card. Since client card 2 receives no new information about this connection from client card 1, the age field of the address of its MAC table is consequently increased.

All this is shown diagrammatically in FIG. 3 where it is assumed that the time elapsed is for example 100 seconds from the start of transmission from the MAC YY address towards ZZ. The age field of the MAC table of client card 2 has therefore reached the figure 100.

The mechanism described thus far is well known to those skilled in the art.

In the prior art realizations, upon reaching a predetermined age (typically 300 seconds) the corresponding entry in the MAC table is deleted. But this leads to the above-mentioned problems of high resource consumption. Indeed, the traffic arriving at line card 1 from the ZZ address towards the YY address cannot but be forwarded from entry card 1 to all the client cards belonging to the VPLS. Otherwise, another MAC address table would have to be memorized and kept in the line card.

While client card 1 has the correct information in its own MAC address table and can thus handle and forward the traffic to the client network, client card 2 no longer has the information because of the expiration of the associated entry in its MAC address table. The only action that it can therefore undertake is to realize flooding towards all its ports towards the client network that are involved in the VPLS as shown diagrammatically in FIG. 4. The resulting inappropriate consumption of resources of the client network is clear.

To avoid all this, in accordance with this invention as shown in FIG. 5, when the maximum preset figure is reached in the age field of a MAC address table, the entry is not automatically deleted but instead the information contained in that specific entry of the MAC address table is verified to determine if it can be deleted or needs advantageously to be updated.

To accomplish this, as seen in FIG. 5, it is assumed that control means 18 be local to the card for detecting reaching of the maximum figure and sending consequently a request for synchronization to the associated client card in the entry of the table, i.e. the one receiving the traffic from the MAC client address. It is noted nevertheless that such control means can reside, in accordance with the chosen implementation, on other units of the apparatus 10 (by way of another example in the central control unit).

In particular, the other associated card (client card 1 in the example) receives the synchronization request and its own local response means 19 send an updating or deletion response depending on the contents of the age field of its own corresponding entry. Advantageously the response means 19 which, in general and depending on the implementation, can even reside on other units of the apparatus 10 (by way of example, in the central control unit) send as updating figure the same figure contained in the age field of its own corresponding entry. In other words, the MAC address table of the client card that receives the traffic and is necessarily the more recent is used.

The synchronization request and resulting exchange of information are diagrammatically indicated by reference number 17 in FIG. 5.

If even the figure of the age field of client card 1 is at its maximum figure, the signal to delete is sent and the entry will be deleted on both the cards because by now really useless. This is shown diagrammatically in FIG. 6.

With the explanations given here, the control and response means are readily imaginable to those skilled in the art. Of course the control means 18 and response means 19 are in all the cards 11 even if for the sake of simplicity in the figures there are shown only those useful at the moment for the description of this invention.

It is now clear that the preset purposes have been achieved, keeping synchronized the different MAC address tables, that reside on different cards belonging to the same VPLS, only when really necessary and for the necessary entries so as to not require a continuous exchange of messages between the cards. To do this, the invention requires only one communication between pairs of client cards (independently of the number of client cards involved in the VPLS) in order to not allow deletion of an entry in a MAC address table if that entry could still be in use. Indeed, the information contained in that entry of the MAC address table allows not transmitting unnecessary packets to the client network thus avoiding band and resources waste that said additional low would entail.

Even though the example with two client cards is given above, the extension to any number of cards is clear since the communication for the updatings of the entries will always take place between pairs of cards associated by the port information contained in the corresponding entries of their MAC table in a manner analogous to the mechanism described above.

This invention gives advantages of not obligating storage and keeping of MAC address tables on the line cards and not obligating keeping the complete MAC address tables of all the client cards synchronized thus avoiding a heavy control traffic between the cards. In addition, it solves the problem of flooding towards the client by the client cards not directly involved in the specific traffic connection within the VPLS and minimizes control communication between the client traffic cards using it only when strictly necessary and useful and only between pairs of cards.

Essentially, this invention allows supplying VPLS services in the simplest and most effective manner both for the network operators and for their clients.

Naturally the above description of an embodiment applying the innovative principles of this invention is given by way of non-limiting example of said principles within the scope of the exclusive right claimed here. For example, division into interfaces and client cards and into interfaces and line cards is given here mainly for convenience of description and understanding. As readily imaginable to those skilled in the art, in one of its more general forms, the interconnection platform will have a generic first series of cards with interface ports and a generic second series of cards with interface ports, interconnectable by an interconnection unit, and the cards of one of the two card series are equipped with MAC address tables managed in accordance with the principles of this invention. Even the definition of 'card' must not necessarily be understood as a card physically separate from the others. In this sense, 'card' can be understood as a group of interface ports having their own MAC address table and a traffic routing logic based on said table.

The invention claimed is:

1. A method of managing MAC address tables in a system having interface ports that interconnect networks, wherein the system comprises a first series of interface port cards, a second series of interface port cards, and an interconnection unit that interconnects both the first and second series of cards and interconnects the cards of the first series, and wherein each of the first series of cards maintain respective MAC address tables for addressing traffic between the interface ports, each table entry having an age field defining the age of the entry, the method comprising:

verifying whether the value of an age field in an entry in a MAC table maintained by a first card in the first series has reached a predetermined maximum value;

if the age value has reached the maximum age value, correlating information in the MAC table entry with entries in a MAC table maintained by another card in the first series by sending a synchronization request from a control function associated with the MAC table maintained by the first card to a control function associated with the MAC table entry maintained by the other card in the first series;

receiving a response from the control function associated with the MAC table entry maintained by the other card in the first series, the response including either an age value or a delete command, depending on the age value in the corresponding MAC table entry maintained by the other card in the first series; and upgrading the MAC table entry maintained by the first card based on the received response.

2. The method of claim 1 wherein upgrading the MAC table entry comprises copying the age value from the corresponding MAC table entry maintained by the other card in the first series.

3. The method of claim 1 wherein upgrading the MAC table entry comprises deleting it if the age value from the corresponding MAC table entry maintained by the other card in the first series has also reached the maximum age value.

4. The method of claim 3 further comprising deleting the corresponding MAC table entry maintained by the other card in the first series.

5. A network interconnection apparatus comprising:

a first series of interface port cards, each maintaining a MAC address table to address traffic between ports through an interconnection unit, each MAC address table entry including an age field;

a second series of interlace port cards;

an interconnection unit operative to selectively interconnect the interface port cards of the first and second series, and to interconnect the interface port cards of the first series;

a control function associated with a first interface port card in the first series, operative to verify whether the value in an age field of a first MAC table entry has reached a predefined maximum age value, and if so, send a synchronization request to another interface port card in the first series; and a control function associated with the other interface port card in the first series, operative to identify a corresponding MAC table entry by correlating information in the first MAC table entry and to respond with either the age field of a corresponding MAC table entry or a delete command, depending on the value in the age field of the corresponding MAC table entry.

6. The apparatus of claim 5 wherein the control function associated with the other interface port card in the first series responds with the age field of the corresponding MAC table entry.

7. The apparatus of claim 5 wherein the control function associated with the other interface port card in the first series responds with a delete command if the value in the age field of the corresponding MAC table entry has also reached the predefined maximum age value.

8. The apparatus of claim 7 wherein the control function associated with the first interface port card in the first series deletes the first MAC table entry and the control function associated with the other interface port card in the first series deletes the corresponding MAC table entry.

9. The apparatus of claim 5 wherein the control functions are local to the respective interface port cards of the first series.

* * * * *

UNITED STATES PATENT AND TRADEMARK OFFICE
CERTIFICATE OF CORRECTION

| | | |
|---|---|---|
| PATENT NO. | : 7,929,545 B2 | Page 1 of 1 |
| APPLICATION NO. | : 12/066980 | |
| DATED | : April 19, 2011 | |
| INVENTOR(S) | : Martinotti et al. | |

It is certified that error appears in the above-identified patent and that said Letters Patent is hereby corrected as shown below:

In Column 7, Line 1, in Claim 5, delete "interlace" and insert -- interface --, therefor.

Signed and Sealed this
Fourth Day of October, 2011

David J. Kappos
*Director of the United States Patent and Trademark Office*